(12) United States Patent
Feller et al.

(10) Patent No.: US 9,404,395 B2
(45) Date of Patent: Aug. 2, 2016

(54) SELECTIVE PRESSURE KETTLE BOILER FOR ROTOR AIR COOLING APPLICATIONS

(71) Applicants: Gerald J. Feller, Orlando, FL (US); John H. Copen, Oviedo, FL (US)

(72) Inventors: Gerald J. Feller, Orlando, FL (US); John H. Copen, Oviedo, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 432 days.

(21) Appl. No.: 14/087,553

(22) Filed: Nov. 22, 2013

(65) Prior Publication Data

US 2015/0143793 A1    May 28, 2015

(51) Int. Cl.

| F02C 6/18 | (2006.01) |
|---|---|
| F02C 6/08 | (2006.01) |
| F01K 23/10 | (2006.01) |
| F02C 7/18 | (2006.01) |
| F22B 1/18 | (2006.01) |
| F22B 33/14 | (2006.01) |
| F01K 13/02 | (2006.01) |
| F02C 6/00 | (2006.01) |

(52) U.S. Cl.
CPC ............... *F01K 23/101* (2013.01); *F01K 13/02* (2013.01); *F01K 23/106* (2013.01); *F02C 6/00* (2013.01); *F02C 6/18* (2013.01); *F02C 7/18* (2013.01); *F02C 7/185* (2013.01); *F22B 1/1815* (2013.01); *F22B 1/1838* (2013.01); *F22B 1/1884* (2013.01); *F22B 33/14* (2013.01); *F01K 23/10* (2013.01); *F05D 2220/72* (2013.01); *Y02E 20/16* (2013.01)

(58) Field of Classification Search
CPC .............. F02C 6/08; F02C 7/185; F01K 3/18; F01K 23/02; F01K 23/06; F01K 23/10; F01K 23/106; F01K 23/108; F01K 7/185

USPC ...................... 122/33, 415 R, 479.6, 415, 414
See application file for complete search history.

(56) References Cited

U.S. PATENT DOCUMENTS

| 3,002,347 | A | * | 10/1961 | Sprague ..................... F01K 3/24 110/260 |
| 3,841,270 | A | * | 10/1974 | Sokolowski ............ F22B 37/74 122/7 R |
| 3,953,966 | A |   | 5/1976 | Martz et al. |
| 4,989,405 | A |   | 2/1991 | Duffy et al. |
| 5,237,816 | A | * | 8/1993 | Duffy ..................... F01K 23/108 60/39.182 |

(Continued)

FOREIGN PATENT DOCUMENTS

| DE | 19832294 C1 | 12/1999 |
| WO | 0031381 A2 | 6/2000 |

*Primary Examiner* — William H Rodriguez
*Assistant Examiner* — Eric Linderman

(57) ABSTRACT

A system for use in a combined cycle power plant including gas and steam turbines includes a single kettle boiler and a valve system. The valve system is operated such that feedwater from a first source passes into the kettle boiler during certain operating conditions, whereas feedwater from a second source passes into the kettle boiler during other operating conditions, wherein the first and second sources have feedwater under different pressures. Rotor cooling air extracted from a compressor section of the gas turbine is cooled with the feedwater in the kettle boiler, wherein at least a portion of the feedwater is evaporated in the kettle boiler by heat transferred to the feedwater from the rotor cooling air to create steam, wherein the valve system is operated to selectively deliver the steam to a first or second steam receiving unit depending on the operating conditions.

20 Claims, 2 Drawing Sheets

(56) References Cited

U.S. PATENT DOCUMENTS

| | | | |
|---|---|---|---|
| 5,251,432 A | 10/1993 | Bruckner et al. | |
| 5,386,685 A * | 2/1995 | Frutschi | F01K 23/106 60/39.182 |
| 5,428,950 A * | 7/1995 | Tomlinson | F01K 23/106 60/39.182 |
| 5,491,971 A * | 2/1996 | Tomlinson | F01K 23/106 60/39.182 |
| 5,577,377 A * | 11/1996 | Tomlinson | F01K 23/106 60/39.182 |
| 5,628,179 A * | 5/1997 | Tomlinson | F01K 23/106 122/7 R |
| 5,628,183 A * | 5/1997 | Rice | F01K 21/042 122/7 B |
| 5,925,223 A * | 7/1999 | Simpson | B01D 3/065 159/17.1 |
| RE36,497 E * | 1/2000 | Tomlinson | F01K 23/106 60/39.182 |
| RE36,524 E * | 1/2000 | Tomlinson | F01K 23/106 122/7 R |
| 6,145,295 A * | 11/2000 | Donovan | F01K 23/106 60/39.182 |
| 6,263,662 B1 * | 7/2001 | Nagashima | F01K 23/106 122/7 B |
| 6,269,626 B1 * | 8/2001 | Kim | F01K 23/106 122/7 B |
| 6,408,612 B2 * | 6/2002 | Hannemann | F02C 6/18 60/39.12 |
| 6,560,965 B1 * | 5/2003 | Fukumoto | F01D 25/002 134/19 |
| 6,598,399 B2 * | 7/2003 | Liebig | F01K 23/10 122/7 B |
| 6,644,035 B1 * | 11/2003 | Yamanaka | F02C 7/185 60/806 |
| 7,243,618 B2 * | 7/2007 | Gurevich | F22B 1/1815 122/406.1 |
| 7,735,459 B2 * | 6/2010 | Cohen | F24D 12/02 122/448.3 |
| 8,195,339 B2 * | 6/2012 | Long | G05B 17/02 60/646 |
| 2006/0248896 A1 * | 11/2006 | Hansson | F01K 21/047 60/774 |

* cited by examiner

SELECTIVE PRESSURE KETTLE BOILER FOR ROTOR AIR COOLING APPLICATIONS

FIELD OF THE INVENTION

The present invention relates to a combined cycle power plant including a single kettle boiler in communication with both first pressure, e.g., low pressure, and second pressure, e.g., intermediate pressure, feedwater sources, which selectively provide feedwater to the kettle boiler during various modes of operation of the power plant.

BACKGROUND OF THE INVENTION

Combined cycle power plants (CCPP) are known in the art as an efficient means for converting fossil fuels to thermal, mechanical and/or electrical energy. Examples of such systems are described in U.S. Pat. Nos. 4,932,204, 5,255,505, 5,357,746, 5,431,007, 5,697,208, and 6,145,295, the entire disclosures of each of which are incorporated by reference herein.

Typical CCPPs include multiple feedwater sources under various pressure, e.g., low and intermediate pressures (LP and IP), wherein each feedwater source is associated with its own kettle boiler.

SUMMARY OF THE INVENTION

In accordance with a first aspect of the present invention, a system is provided for use in a combined cycle power plant including a gas turbine and a steam turbine. The system comprises a single kettle boiler and a valve system. The kettle boiler selectively receives feedwater from both a first source and a second source, wherein a pressure of the feedwater in the first source is less than a pressure of the feedwater in the second source. The valve system comprises first and second inlet valves upstream from the kettle boiler that selectively deliver feedwater from the respective first and second sources to the kettle boiler, and first and second outlet valves downstream from the kettle boiler that selectively deliver steam from the kettle boiler to respective first and second steam receiving units. During a first mode of operation of the combined cycle power plant, the first inlet valve is open and the second inlet valve is closed such that feedwater from the first source is delivered into the kettle boiler but feedwater from the second source is not delivered into the kettle boiler; rotor cooling air extracted from a compressor section of the gas turbine is cooled with the feedwater in the kettle boiler from the first source and delivered back into a turbine section of the gas turbine, wherein at least a portion of the feedwater from the first source is evaporated in the kettle boiler by heat transferred to the feedwater from the rotor cooling air to create first steam; and the first outlet valve is open and the second outlet valve is closed such that the first steam is delivered from the kettle boiler into the first steam receiving unit but not to the second steam receiving unit. During a second mode of operation of the combined cycle power plant, the first inlet valve is closed and the second inlet valve is open such that feedwater from the second source is delivered into the kettle boiler but feedwater from the first source is not delivered into the kettle boiler; rotor cooling air extracted from the compressor section of the gas turbine is cooled with the feedwater in the kettle boiler from the second source and delivered back into the turbine section of the gas turbine, wherein at least a portion of the feedwater from the second source is evaporated in the kettle boiler by heat transferred to the feedwater from the rotor cooling air to create second steam; and the first outlet valve is closed and the second outlet valve is open such that the second steam is delivered from the kettle boiler into the second steam receiving unit but not to the first steam receiving unit.

The first and second steam receiving units may each comprise a drum that receives the respective first and second steams from the kettle boiler, and the first and second steam receiving units may each further comprise a superheater that provides additional heat to the first and second steam to create superheated steam, wherein the superheated steam is provided to drive the steam turbine to produce power.

The first mode of operation may be less than full load operation and the second mode of operation may be full load operation.

The system may further comprise a controller to operate the valve system to selectively open and close the inlet and outlet valves based on a rotor cooling air temperature setpoint.

The rotor cooling air temperature setpoint may be higher during full load operation than during less than full load operation.

The system may further comprise at least one injection port in communication with the kettle boiler for providing a fluid into the kettle boiler to effect a change in a pressure within the kettle boiler when the combined cycle power plant is transitioned between the first and second modes of operation. The at least one injection port may comprise at least one water injection port and at least one steam injection port, wherein water may be injected into the kettle boiler by the at least one water injection port to reduce the pressure within the kettle boiler when the combined cycle power plant is transitioned from the second mode of operation to the first mode of operation, and steam may be injected into the kettle boiler by the at least one steam injection port to increase the pressure within the kettle boiler when the combined cycle power plant is transitioned from the first mode of operation to the second mode of operation.

The single kettle boiler is preferably the sole kettle boiler provided in the combined cycle power plant, such that operation of the combined cycle power plant during the first and second modes of operation is performed without bypassing any additional kettle boilers.

In accordance with a second aspect of the present invention, a method is provided for operating a combined cycle power plant including a gas turbine and a steam turbine. During a first mode of operation of the combined cycle power plant, feedwater is delivered from a first source into a kettle boiler but feedwater is not delivered from a second source into the kettle boiler, the first and second sources being in communication with the kettle boiler via first and second inlet valves, wherein a pressure of the feedwater in the first source is less than a pressure of the feedwater in the second source. Rotor cooling air extracted from a compressor section of the gas turbine is cooled with the feedwater in the kettle boiler from the first source, wherein at least a portion of the feedwater from the first source is evaporated in the kettle boiler by heat transferred to the feedwater from the rotor cooling air to create first steam. The cooled rotor cooling air is delivered back into a turbine section of the gas turbine, and the first steam is delivered from the kettle boiler into a first steam receiving unit but not to a second steam receiving unit, wherein the first and second steam receiving units are in communication with the kettle boiler via first and second outlet valves. During a second mode of operation of the combined cycle power plant, feedwater from the second source is delivered into the kettle boiler but feedwater from the first source is not delivered into the kettle boiler. Rotor cooling air extracted from the compressor section of the gas turbine is cooled by the feedwater in the kettle boiler from the second source, wherein at least a portion of the feedwater from the second source is evaporated in the kettle boiler by heat transferred to the feedwater from the rotor cooling air to create second steam. The cooled rotor cooling air is delivered back into the turbine section of the gas turbine and the second steam is delivered from the kettle boiler into the second steam receiving unit but not to the first steam receiving unit.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of a preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
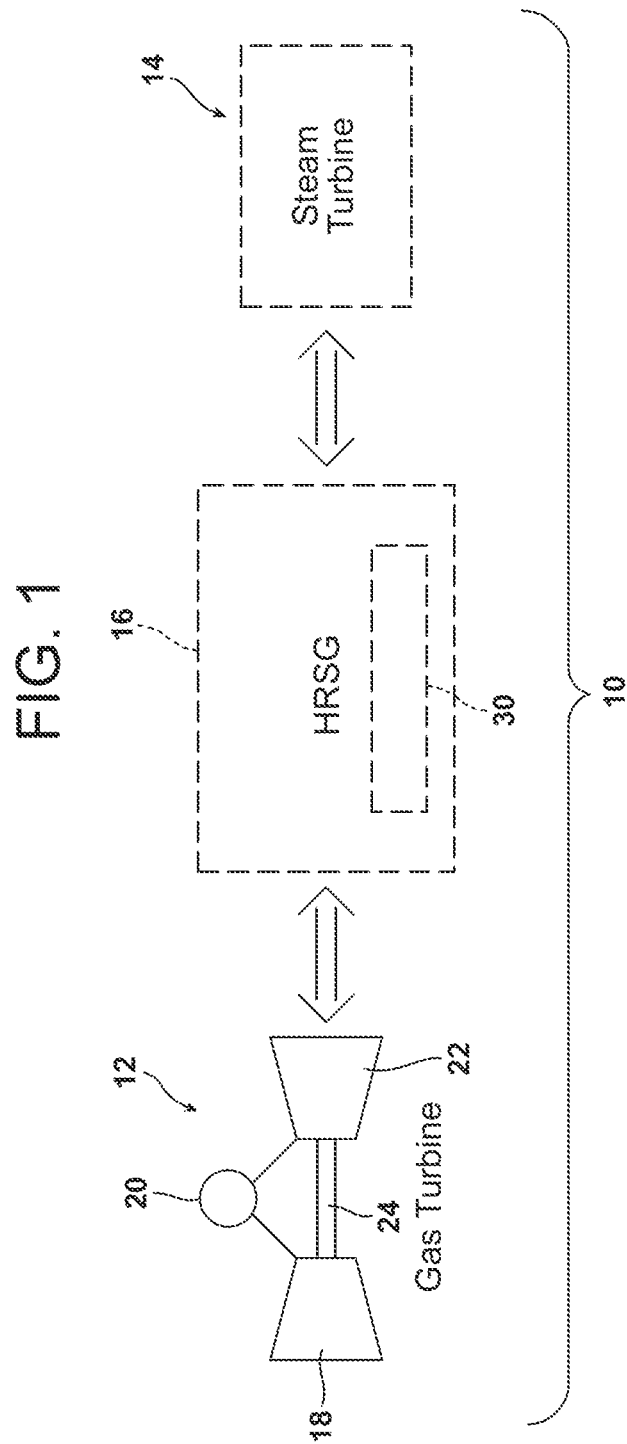
FIG. 1 is a diagrammatic illustration of a combined cycle power plant in accordance with an embodiment of the invention.

Referring now to FIG. 1, there is shown a combined cycle power plant (hereinafter "CCPP") 10 having, generally, a gas turbine 12, a steam turbine 14, and a heat recovery steam generator (hereinafter "HRSG") 16. The gas turbine 12 includes a compressor section (hereinafter "GT compressor") 18 that compresses air drawn into the gas turbine 12, a combustion section 20 where compressed air from the GT compressor 18 and fuel are ignited to generate hot combustion products defining hot working gases, and a turbine section (hereinafter "GT turbine") 22 where the hot working gases from the combustion section 20 are expanded to drive a gas turbine rotor 24. The steam turbine 14 may include conventional components, including, for example, a high/intermediate pressure turbine and a low pressure turbine, as will be appreciated by those having ordinary skill in the art.

Figure 2:
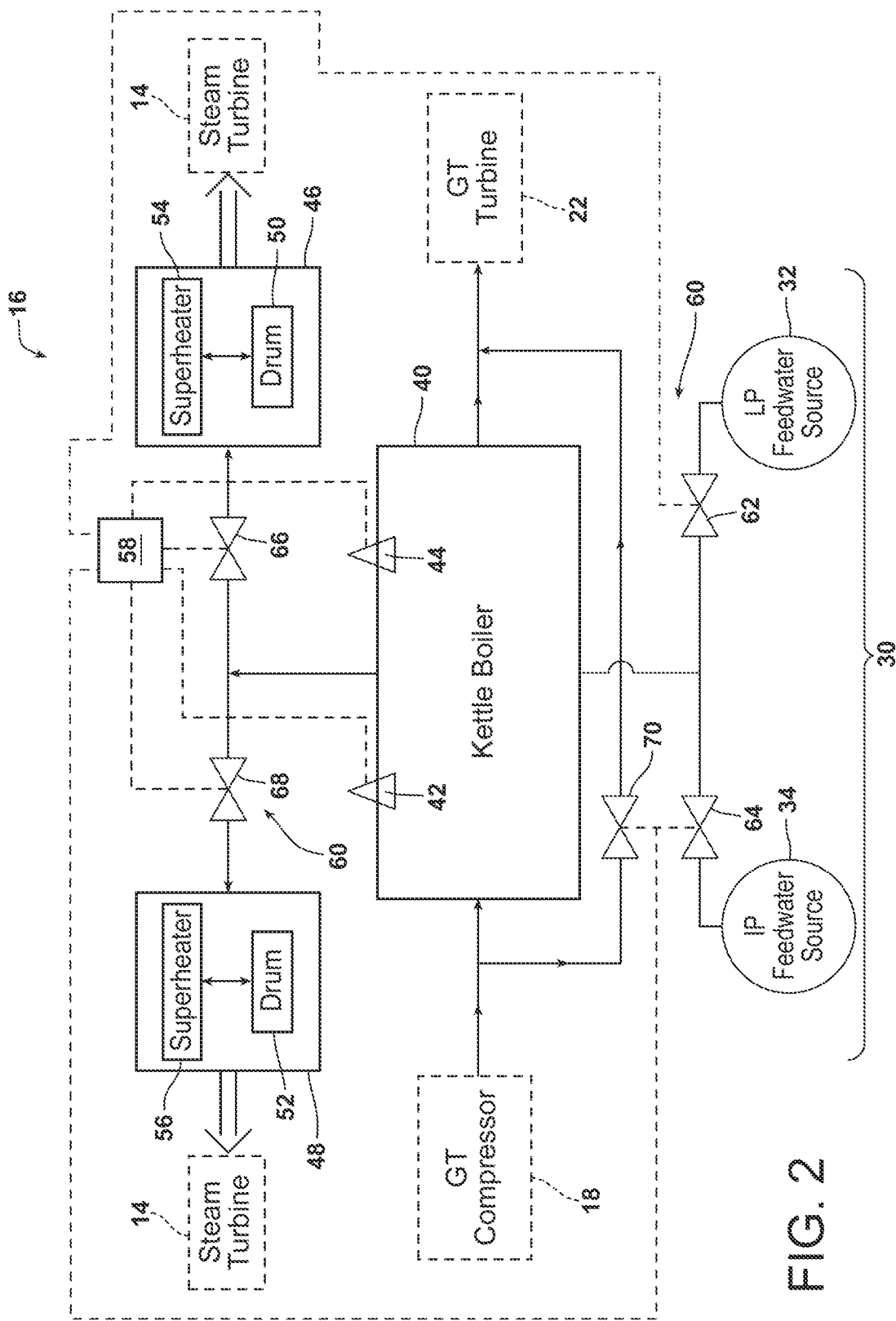
FIG. 2 is a diagrammatic illustration of a system included in a heat recovery steam generator of the combined cycle power plant of FIG. 1, the system including a selective pressure kettle boiler.

Referring now to FIG. 2, a system 30 of the HRSG 16 from FIG. 1 is illustrated and will now be described. The system 30 shown in FIG. 2 comprises a first source of feedwater 32, also referred to herein as a low pressure (hereinafter "LP") feedwater source 32, having a first pressure, and a second source of feedwater 34, also referred to herein as an intermediate pressure (hereinafter "IP") feedwater source 34, having a second pressure greater than the first pressure. The LP and IP feedwater sources 32, 34 may include conventional components, such as, for example, one or more condensate supplies, condensate preheaters, economizers, and pumps. The HRSG 16 may also include one or more additional sources of feedwater, such as a third source of feedwater comprising a high pressure feedwater source. Hence, the present invention is not intended to be limited to the HRSG 16 including only the two sources of feedwater 32, 34 shown in FIG. 2.

The system 30 also includes a single kettle boiler 40 that selectively receives feedwater from both the LP and IP feedwater sources 32, 34 as will be described herein. Since the single kettle boiler 40 services both the LP and IP feedwater sources 32, 34, separate kettle boilers for the LP and IP feedwater sources 32, 34 are not required.

The kettle boiler 40 may include, for example, a tube and shell type heat exchanger having compressed air on the tube side and water/steam on the shell side, as will be appreciated by one having ordinary skill in the art. As shown in FIG. 2, the system 30 also includes water and steam injection ports 42, 44 in communication with the kettle boiler 40 for respectively providing fluids, i.e., water and steam, into the kettle boiler 40 to effect a change in a pressure and/or temperature within the kettle boiler 40 as will be described in greater detail herein.

Referring still to FIG. 2, the system 30 additionally includes a first steam receiving unit 46, also referred to herein as an LP steam receiving unit 46 and a second steam receiving unit 48, also referred to herein as an IP steam receiving unit 48. The LP and IP steam receiving units 46, 48 illustrated in FIG. 2 include respective drums 50, 52 for holding respective portions of LP and IP water/steam, and superheaters 54, 56 for heating respective portions of LP and IP steam to create LP and IP superheated steam, also referred to herein as first and second steam, which may then be conveyed on to the steam turbine 14 as will be described in greater detail herein. The LP and IP steam receiving units 46, 48 may additionally include other conventional components without departing from the scope and spirit of the invention. The HRSG 16 may also include one or more additional steam receiving units, such as a third steam receiving unit comprising a high pressure drum and a corresponding superheater. Hence, the present invention is not intended to be limited to the HRSG 16 including only two steam receiving units 46, 48, although the HRSG 16 preferably includes the same number of steam receiving units as sources of feedwater.

The system 30 further includes a controller 58 that controls operation of a valve system 60 of the system 30. The valve system 60 includes first and second inlet valves 62, 64 upstream from the kettle boiler 40 that selectively deliver feedwater from the LP and IP feedwater sources 32, 34 to the kettle boiler 40. The valve system 60 also includes first and second outlet valves 66, 68 downstream from the kettle boiler 40 that selectively deliver steam from the kettle boiler 40 to the LP and IP steam receiving units 46, 48. In this regard, it is noted that the steam delivered from the kettle boiler 40 into the LP and IP steam receiving units 46, 48 may pass directly into the corresponding drums 50, 52 and then on to the corresponding superheaters 54, 56; or the steam may pass directly into the corresponding superheaters 54, 56 and then on the corresponding drums 50, 52; or the steam may pass into the respective drums 50, 52 or superheaters 54, 56 and then optionally onto other components of the CCPP 10 without subsequently passing into the others of the drums 50, 52 or superheaters 54, 56. The steam in the LP and IP steam receiving units 46, 48 may then be delivered to other components of the CCPP 10, such as, for example, to appropriate sections of the steam turbine 14 as will be apparent to those having ordinary skill in the art.

The controller 58 may also control operation of the water and steam injection ports 42, 44, and may further control operation of a kettle boiler bypass valve 70, which will be described in further detail below.

Operation of the CCPP 10 will now be described. It is noted that operation of components of the CCPP 10 not related to the system 30 will not be specifically described herein, as operation of those components will be apparent to those having ordinary skill in the art.

During a first mode of operation, also referred to herein as less than full load operation or part load operation, the controller 58 controls the valve system 60 such that the first inlet valve 62 is open and the second inlet valve 64 is closed, wherein feedwater from the LP feedwater source 32 is delivered into the kettle boiler 40 but feedwater from the IP feedwater source 34 is not delivered into the kettle boiler 40. Rotor cooling air extracted from the compressor section 18 of the gas turbine 12 (the GT compressor 18) is delivered into the kettle boiler 40 and is cooled with the feedwater in the kettle boiler 40 from the LP feedwater source 32. The cooled rotor cooling air is then delivered back into the turbine section 22 of the gas turbine 12 (GT turbine 22) where it may be used to cool components within the turbine section 22, such as, for example, stationary vanes, rotating blades (not shown), and/or the rotor 24. As a result of the heat transferred from the rotor cooling air to the LP feedwater in the kettle boiler 40, at least a portion of the LP feedwater is evaporated in the kettle boiler 40 to create first steam, also referred to herein as LP steam.

The LP steam then exits the kettle boiler 40, wherein, during the first mode of operation, the controller 58 controls the valve system 60 such that the first outlet valve 66 is open and the second outlet valve 68 is closed, wherein the LP steam is delivered from the kettle boiler 40 into the LP steam receiving unit 46 but not into the IP steam receiving unit 48. As noted above, the LP steam may be delivered into the corresponding drum 50 or superheater 54, wherein it may then be conveyed into either the other of the corresponding drum 50 or superheater 54, or it may be delivered to other components in the CCPP 10. For example, if the LP steam is delivered into the superheater 54, either after, before, or without being delivered into the drum 50, the LP steam, which is further heated in the superheater 54 with additional heat to create superheated LP steam, may be delivered to the steam turbine 14 where it may be used to drive a component of the steam turbine 14, e.g., the low pressure turbine, to produce power in a manner that will be apparent to those having ordinary skill in the art.

During a second mode of operation, also referred to herein as full load operation or base load operation, the controller 58 controls the valve system 60 such that the first inlet valve 62 is closed and the second inlet valve 64 is open, wherein feedwater from the IP feedwater source 34 is delivered into the kettle boiler 40 but feedwater from the LP feedwater source 32 is not delivered into the kettle boiler 40. Rotor cooling air extracted from the compressor section 18 of the gas turbine 12 is delivered into the kettle boiler 40 and is cooled with the feedwater in the kettle boiler 40 from the IP feedwater source 34. The cooled rotor cooling air is then delivered back into the turbine section 22 of the gas turbine 12 where it may be used to cool components within the turbine section 22. As a result of the heat transferred from the rotor cooling air to the IP feedwater in the kettle boiler 40, at least a portion of the IP feedwater is evaporated in the kettle boiler 40 to create second steam, also referred to herein as IP steam.

The IP steam then exits the kettle boiler 40, wherein, during the second mode of operation, the controller 58 controls the valve system 60 such that the first outlet valve 66 is closed and the second outlet valve 68 is open, wherein the IP steam is delivered from the kettle boiler 40 into the IP steam receiving unit 48 but not into the LP steam receiving unit 46. As noted above, the IP steam may be delivered into the corresponding drum 52 or superheater 56, wherein it may then be conveyed into either the other of the corresponding drum 52 or superheater 56, or it may be delivered to other components in the CCPP 10. For example, if the IP steam is delivered into the superheater 56, either after, before, or without being delivered into the drum 52, the IP steam, which is further heated in the superheater 56 with additional heat to create superheated IP steam, may be delivered to the steam turbine 14 where it may be used to drive a component of the steam turbine 14, e.g., the high/intermediate steam turbine, to produce power in a manner that will be apparent to those having ordinary skill in the art.

According to an aspect of the present invention, the controller 58 may control operation of the valve system 60 to selectively open and close the inlet and outlet valves 62, 64, 66, 68 based on a rotor cooling air temperature setpoint, which is typically selected as a function of the operating mode of the CCPP 10. For example, during less than full load operation, i.e., the first mode of operation discussed above, the rotor cooling air temperature setpoint may be lower than during full load operation, i.e., the second more of operation discussed above. Hence, during less than full load operation where the rotor cooling air temperature setpoint is lower, LP feedwater may be delivered into the kettle boiler 40 to cool the rotor cooling air to a first temperature, which is lower than a second temperature to which IP feedwater delivered into the kettle boiler 40 may cool the rotor cooling air to during full load operation where the rotor cooling air temperature setpoint is higher.

The controller 58 may also control operation of the water and steam injection ports 42, 44 to adjust the pressure and/or temperature within the kettle boiler 40 as needed. For example, if it is desired to reduce the pressure and/or temperature within the kettle boiler 40, the controller 58 may cause the water injection port 42 to inject water into the kettle boiler 40 to reduce the pressure and/or temperature within the kettle boiler 40. This may be desirable when the CCPP 10 is transitioned from full load operation to less than full load operation. As another example, if it is desired to increase the pressure and/or temperature within the kettle boiler 40, the controller 58 may cause the steam injection port 44 to inject steam into the kettle boiler 40 to increase the pressure and/or temperature within the kettle boiler 40. This may be desirable when the CCPP 10 is transitioned from less than full load operation to full load operation.

Moreover, the controller 58 may further control operation of the kettle boiler bypass valve 70 such that some or all of the rotor cooling air from the CT compressor 18 bypasses the kettle boiler 40 and is then delivered back into the GT turbine 22 without being cooled in the kettle boiler 40. This may be desirable to fine tune cooling of the components within the turbine section 22 and/or to fine tune performance of the gas turbine 12. For example, by adjusting the temperature of the rotor cooling air, the temperature of the hot working gases passing through the turbine section 22 may be controlled, e.g., since at least some of the rotor cooling air introduced into the turbine section 22 ends up mixing with the hot working gases to cause cooling of the hot working gases after the rotor cooling air provides its cooling function, wherein the temperature of the hot working gases directly impacts the efficiency of the gas turbine 12.

According to another aspect of the present invention, since the single kettle boiler 40 is the sole kettle boiler 40 provided in the exemplary CCPP 10 shown, and the single kettle boiler 40 services both the LP and IP feedwater sources 32, 34 and LP and IP steam receiving units 46, 48, operation of the CCPP 10 during the full load operation and less than full load operation performed without bypassing any additional kettle boilers. Since switching between multiple kettle boilers can be complex and expensive, these difficulties that may be present with such kettle boiler bypassing are avoided by the present system 30.

While a particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for use in a combined cycle power plant including a gas turbine and a steam turbine, the system comprising:
    a single kettle boiler that selectively receives feedwater from both a first source and a second source, a pressure of the feedwater in the first source being less than a pressure of the feedwater in the second source; and
    a valve system comprising:
        first and second inlet valves upstream from the kettle boiler that selectively deliver feedwater from the respective first and second sources to the kettle boiler; and
        first and second outlet valves downstream from the kettle boiler that selectively deliver steam from the kettle boiler to respective first and second steam receiving units;
    wherein, during a first mode of operation of the combined cycle power plant:
        the first inlet valve is open and the second inlet valve is closed such that feedwater from the first source is delivered into the kettle boiler but feedwater from the second source is not delivered into the kettle boiler;
        rotor cooling air extracted from a compressor section of the gas turbine is cooled with the feedwater in the kettle boiler from the first source and delivered back into a turbine section of the gas turbine, wherein at least a portion of the feedwater from the first source is evaporated in the kettle boiler by heat transferred to the feedwater from the rotor cooling air to create first steam; and
        the first outlet valve is open and the second outlet valve is closed such that the first steam is delivered from the kettle boiler into the first steam receiving unit but not to the second steam receiving unit; and
    wherein, during a second mode of operation of the combined cycle power plant:
        the first inlet valve is closed and the second inlet valve is open such that feedwater from the second source is delivered into the kettle boiler but feedwater from the first source is not delivered into the kettle boiler;
        rotor cooling air extracted from the compressor section of the gas turbine is cooled with the feedwater in the kettle boiler from the second source and delivered back into the turbine section of the gas turbine, wherein at least a portion of the feedwater from the second source is evaporated in the kettle boiler by heat transferred to the feedwater from the rotor cooling air to create second steam; and
        the first outlet valve is closed and the second outlet valve is open such that the second steam is delivered from the kettle boiler into the second steam receiving unit but not to the first steam receiving unit.

2. The system of claim 1, wherein the first and second steam receiving units each comprise a drum that receives the respective first and second steams from the kettle boiler.

3. The system of claim 2, wherein the first and second steam receiving units each further comprise a superheater that provides additional heat to the first and second steam to create superheated steam, wherein the superheated steam is provided to drive the steam turbine to produce power.

4. The system of claim 1, wherein the first mode of operation is less than full load operation and the second mode of operation is full load operation.

5. The system of claim 4, further comprising a controller to operate the valve system to selectively open and close the inlet and outlet valves based on a rotor cooling air temperature setpoint.

6. The system of claim 5, wherein the rotor cooling air temperature setpoint is higher during full load operation than during less than full load operation.

7. The system of claim 1, further comprising at least one injection port in communication with the kettle boiler for providing a fluid into the kettle boiler to effect a change in a pressure within the kettle boiler when the combined cycle power plant is transitioned between the first and second modes of operation.

8. The system of claim 7, wherein the at least one injection port comprises at least one water injection port and at least one steam injection port.

9. The system of claim 8, wherein:
    water is injected into the kettle boiler by the at least one water injection port to reduce the pressure within the kettle boiler when the combined cycle power plant is transitioned from the second mode of operation to the first mode of operation; and
    steam is injected into the kettle boiler by the at least one steam injection port to increase the pressure within the kettle boiler when the combined cycle power plant is transitioned from the first mode of operation to the second mode of operation.

10. The system of claim 1, wherein the single kettle boiler is the sole kettle boiler provided in the combined cycle power plant, such that operation of the combined cycle power plant during the first and second modes of operation is performed without bypassing any additional kettle boilers.

11. A method for operating a combined cycle power plant including a gas turbine and a steam turbine, the method comprising:
    during a first mode of operation of the combined cycle power plant:
        delivering feedwater from a first source into a kettle boiler but not delivering feedwater from a second source into the kettle boiler, the first and second sources being in communication with the kettle boiler via first and second inlet valves, wherein a pressure of the feedwater in the first source is less than a pressure of the feedwater in the second source;
        cooling rotor cooling air extracted from a compressor section of the gas turbine with the feedwater in the kettle boiler from the first source, wherein at least a portion of the feedwater from the first source is evaporated in the kettle boiler by heat transferred to the feedwater from the rotor cooling air to create first steam;
        delivering the cooled rotor cooling air back into a turbine section of the gas turbine; and
        delivering the first steam from the kettle boiler into a first steam receiving unit but not to a second steam receiving unit, wherein the first and second steam receiving units are in communication with the kettle boiler via first and second outlet valves; and during a second mode of operation of the combined cycle power plant:
  delivering feedwater from the second source into the kettle boiler but not delivering feedwater from the first source into the kettle boiler;
  cooling rotor cooling air extracted from the compressor section of the gas turbine by the feedwater in the kettle boiler from the second source, wherein at least a portion of the feedwater from the second source is evaporated in the kettle boiler by heat transferred to the feedwater from the rotor cooling air to create second steam;
  delivering the cooled rotor cooling air back into the turbine section of the gas turbine; and
  delivering the second steam from the kettle boiler into the second steam receiving unit but not to the first steam receiving unit.

12. The method of claim 11, wherein the first and second steam receiving units each include a superheater, and further comprising using the respective superheaters to further heat the first and second steam to create superheated steam.

13. The method of claim 12, further comprising providing the superheated steam to the steam turbine to drive the steam turbine to produce power.

14. The method of claim 11, further comprising selectively operating the inlet and outlet valves based on a rotor cooling air temperature setpoint.

15. The method of claim 14, wherein the first mode of operation is less than full load operation and the second mode of operation is full load operation.

16. The method of claim 15, wherein the rotor cooling air temperature setpoint is higher during full load operation than during less than full load operation.

17. The method of claim 16, further comprising injecting a fluid into the kettle boiler to effect a change in a pressure within the kettle boiler when the combined cycle power plant is transitioned between full and less than full load operation.

18. The method of claim 17, wherein the at least one injection port comprises at least one water injection port and at least one steam injection port.

19. The method of claim 18, further comprising:
  injecting water into the kettle boiler by the at least one water injection port to reduce the pressure within the kettle boiler when the combined cycle power plant is transitioned from full load operation to less than full load operation; and
  injecting steam into the kettle boiler by the at least one steam injection port to increase the pressure within the kettle boiler when the combined cycle power plant is transitioned from less than full load operation to full load operation.

20. The method of claim 15, wherein the single kettle boiler is the sole kettle boiler in the combined cycle power plant, such that operation of the combined cycle power plant during full and less than full load operation is performed without bypassing any additional kettle boilers.

\* \* \* \* \*